(12) United States Patent
Nassif et al.

(10) Patent No.: US 11,126,785 B1
(45) Date of Patent: Sep. 21, 2021

(54) ARTIFICIAL INTELLIGENCE SYSTEM FOR OPTIMIZING NETWORK-ACCESSIBLE CONTENT

(71) Applicant: Amazon Technologies, Inc., Reno, NV (US)

(72) Inventors: Houssam Nassif, Seattle, WA (US); Daniel Hill, Sunnyvale, CA (US); Tao Hu, Seattle, WA (US); Anand Mahadeva Iyer, Bellevue, WA (US); Jian Liu, Seattle, WA (US); Yi Liu, Seattle, WA (US); Sriram Srinivasan, Santa Cruz, CA (US); Vishwanathan Swaminathan, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 15/436,359

(22) Filed: Feb. 17, 2017

(51) Int. Cl.
   *G06F 40/106* (2020.01)
   *G06N 7/00* (2006.01)
   *G06F 40/14* (2020.01)

(52) U.S. Cl.
   CPC ............ *G06F 40/106* (2020.01); *G06F 40/14* (2020.01); *G06N 7/005* (2013.01)

(58) Field of Classification Search
   CPC .. G06F 17/212; G06F 17/2247; G06F 3/0484; G06F 40/106; G06F 40/14; G06N 7/005
   See application file for complete search history.

(56) References Cited

U.S. PATENT DOCUMENTS

| | | | | |
|---|---|---|---|---|
| 6,317,722 B1 * | 11/2001 | Jacobi | ................... | G06Q 30/02 705/14.51 |
| 8,433,611 B2 * | 4/2013 | Lax | ..................... | H04N 21/435 705/14.4 |
| 10,049,169 B2 * | 8/2018 | Catlin | ................... | G06Q 30/02 |
| 2009/0113288 A1 * | 4/2009 | Thampy | ............. | G06F 16/9577 715/234 |
| 2009/0248513 A1 * | 10/2009 | Aggarwal | ......... | G06Q 30/0242 705/14.72 |
| 2016/0092781 A1 * | 3/2016 | Byrnes | ............... | G06Q 30/0631 706/52 |
| 2016/0364935 A1 * | 12/2016 | Koehler | ............ | G06Q 30/0249 |
| 2017/0061481 A1 * | 3/2017 | Wee | .................... | G06Q 30/0201 |

OTHER PUBLICATIONS

Guo, Weiyu "Adaptve Pairwise Learning for Personalized Ranking with COntent and Implicit Feedback" IEEE 2015 (Year: 2015).*

* cited by examiner

*Primary Examiner* — Stephen S Hong
*Assistant Examiner* — Nicholas Hasty
(74) *Attorney, Agent, or Firm* — Hogan Lovells US LLP

(57) ABSTRACT

An optimal combination of content items may be determined and served to increase the likelihood of a predefined user interaction. A user can request content which may include an entity (such as a web page, document, advertisement, and the like) that has multiple components through which content items may be provided. For example, a web page may include multiple slots where content items may be displayed on the web page. Each component may be associated with multiple possible content items, resulting in many combinations of layouts for an entity. A content server may determine which layout to provide using a content selection model that is weighted based on a likelihood of groupings of content items resulting in a user interaction that satisfies a success condition (e.g., selecting a hyperlink, selecting a content item, initiating a transaction, etc.).

19 Claims, 9 Drawing Sheets

ARTIFICIAL INTELLIGENCE SYSTEM FOR OPTIMIZING NETWORK-ACCESSIBLE CONTENT

BACKGROUND

Users are increasingly utilizing electronic devices to locate, obtain, and view various types of information. For example, users may utilize a search engine to locate information about various items, such as items offered through an electronic marketplace. When a user is viewing content, there may be a variety of ways in which that content can be presented. Some presentations may be useful to the user and retain the user's interest, while other presentations may lose the user's interest. Given the amount of content available to be presented, identifying an optimized combination can be challenging. Traditional multivariate analyses have included generating each possible combination of content and presenting the combinations to different users. By monitoring how the users interact with the various combinations of content, an optimal combination (e.g., a combination resulting in a high success rate based on one or more metrics) may be identified. However, such fully factorial analyses can require substantial traffic to identify the optimal combination, particularly as the number of available content items increases. Even high traffic web sites may require months of traffic to test combinations before the optimum combination can be determined. Additionally, such techniques are not adaptable to changing conditions and preferences, leading to a combination that may only be optimal for a subset of users under particular conditions. Accordingly, providing the user with a combination of content that is optimized for the user can result in increased user engagement, higher profitability, or other favorable results for the provider of that content.

BRIEF DESCRIPTION OF THE DRAWINGS

Various embodiments in accordance with the present disclosure will be described with reference to the drawings, in which.

DETAILED DESCRIPTION

Figure 1:
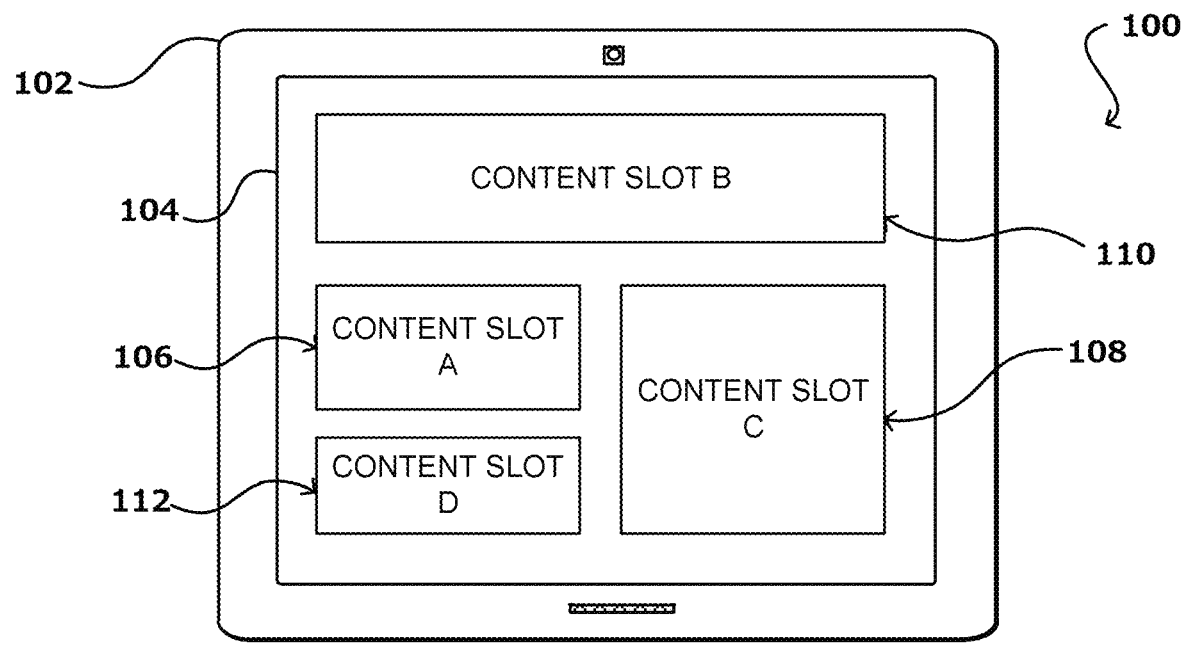
FIG. 1 illustrates an example of a content layout that can be presented to a user in accordance with various embodiments.

Systems and methods in accordance with various embodiments of the present disclosure may overcome one or more of the aforementioned and other deficiencies experienced in conventional approaches to determining content to provide to a user. In particular, various embodiments attempt to determine an optimal combination of content items for a predetermined interaction. For example, a user can use a computing device to request content. The requested content may include an entity (such as a web page, document, advertisement, and the like) that includes multiple components through which content items may be provided. For example, a web page may include multiple slots where content items may be displayed on the web page. Each component may be associated with multiple possible content items, resulting in many combinations of layouts for an entity. The request may be transmitted to another computing device, such as a content optimization system or another user computing device that processes the request and provides the requested content or information regarding the request. The content optimization system may determine which layout to provide using a content selection model. The content selection model may define weights for combinations of content items, where the weights indicate a likelihood of that combination of content items resulting in a user interaction that satisfies a success condition (e.g., selecting a hyperlink, selecting a content item, initiating a transaction, etc.). The model may be defined in terms of pairs of content items, enabling the optimal combination of content items to be identified much more quickly as compared to full factorial analyses.

Content experiments designed to optimize a single component limits the amount of information that can be obtained for user interaction with content compared to making multiple changes at once to an entity. Embodiments enable multiple changes to be made to the content included in an entity (e.g., web page, advertisement, or other collection of content items) and the effectiveness of that new combination can then be assessed. In some embodiments, an entity may be defined as having multiple components, where each component may be associated with several possible content items. Bandit strategies (e.g., explore-exploit algorithms) may be used to determine an optimal combination of content items for an entity. In some embodiments, each component may be associated with a bandit model that is configured to select a content item for its component based on context information and the selections of the other bandit models. For example, each component may be randomly assigned a content item. Each bandit model in turn may then select a content item based on a content selection model. For example, an image bandit model may select an image content item based on the randomly assigned header and text content items. Then a header bandit model may select a header content item based on the image content item and the randomly selected text content item. Then a text bandit model may select a text content item based on the image and header content items. This process may continue for a set number of iterations or until the bandit models converge on a single combination. This combination may then be presented in the entity (e.g., the determined combination may be displayed to the user in a web page, or other entity). In some embodiments, a single bandit model may be used to determine the optimal content item for each component in a layout.

Optimizing for a success condition given multiple components can be resource intensive. For example, determining the probability of a success condition for a particular combination of image, text, and header components (e.g., P(image, text, header)) may be costly. However, sampling techniques, such as Thompson sampling, Gibbs sampling, or other techniques, may be used to approximate the distribution of the probability of success of a given image, text, and heading combination. Using sampling techniques, estimates of pairwise (or other groupings) probability (e.g., P(image|text,heading); P(text|image,heading); and P(heading|image,text)) may be calculated, which are less resource intensive. This allows for the optimal combination of content items to be selected and provided without requiring a delay to load the entity being optimized.

In traditional testing methods, such as A/B testing, two groups may be randomly established. A first group may be a control group, where the combination of content items in a layout remains unchanged. A second group may be a treatment group, where the combination of content items is changed. The operator of the site running the experiment may wish to know if the change affects how users interact with the site (e.g., how long users remain at the website, which links users click on the website, etc.). Thus, the operator runs the experiment and at the end of the experiment compares the results from the two groups. However, generally in order to obtain enough data for a period of time for there to be statistical significance and to identify any differences between the groups, the experiment may need to run for three months, six months or even a year. This can create a burden (in terms of computing resources and network bandwidth) for the operator of the site.

Embodiments of the present invention enable multivariate testing of layouts to determine an optimal layout using significantly less network traffic when compared to traditional testing. By using a greedy approach, in which a local optimum may be selected at each step, the optimal layout may be identified using a tenth of the network traffic required by traditional testing techniques, such as A/B testing. As discussed further herein, the combinations of content items shown to users may be selected using a bandit model that preferentially shows combinations having a higher expected return value (e.g., combinations that are expected to result in a desired interaction). This dynamic allocation of network traffic enables optimal combinations to be identified much more quickly, using fewer computing resources, than prior testing methods.

Various other functions and advantages are described and suggested below as may be provided in accordance with the various embodiments.

FIG. 1 illustrates an example 100 of a content layout that can be presented to a user in accordance with various embodiments. As shown in FIG. 1, an interface on a display screen 104 of a computing device 102 might display content to a user per conventional approaches. Although a portable computing device (e.g., a smart phone, an electronic book reader, or tablet computer) is shown, it should be understood that any device capable of receiving and processing input and providing outputs can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, a user has navigated to (or otherwise arrived at) a web page, which includes multiple content slots 106-112. Other approaches to arriving at such a display of content can be utilized as well, such as entering a search query that causes a set of search results to be displayed on the display screen, etc. Content slots 106-112 may also be referred to herein as components or widgets. Each widget may be a portion of a web page, or other collection of media, which presents information. As discussed, each widget may be associated with a set of content items that the widget is configured to present. In some embodiments, a widget may be a stand-alone application with limited functionality that can be installed and executed within a web page at the client device.

Although the embodiment shown in FIG. 1 depicts web page content, embodiments may be used to determine an optimal combination of components across various media. For example, a voice-enabled communications device may be configured to provide audio and image content in response to a received audio command. In such an example, the audio and image content may each be treated as components, the combination of which may be optimized in accordance with various embodiments. A voice-enabled communications device may be coupled to a television, monitor, or other display device. The voice-enabled communications device may monitor audio content in its vicinity for instructions or requests. When such a request is received, the voice-enabled communications device may be configured to send an electronic message (e.g., text message or voice message), initiate a telephone call, perform a search, display content items, play an audio recording, or other action. In response to a request, the voice-enabled communications device may provide a response visually (e.g., using the coupled display device) and using audio. As in the web page example, multiple content items may be available for the visual component and audio component. The optimized combination of visual and audio content items may be determined in accordance with various embodiments.

Each content slot may be associated with one or more content items that may be selected by a content optimization system when the user navigates to the web page. However, as discussed, determining which content to display together can be time consuming due to the potentially large combinations of content. For example, if each slot is associated with 10 content items, then for the four slots shown in FIG. 1, there are 10,000 possible combinations. As the number of possible content items increases, this can become unmanageable (e.g., if each slot is associated with 100 content items, then there are 100 million combinations). All possible combinations can be served to users and tested to determine which particular combination results in improved interaction with the web page or other content. However, with large numbers of combinations, such testing may take so long as to be unfeasible or impractical. Additionally, such testing typically results in a single combination determined to be optimized for a given interaction or other metric. As such, the resulting combination may not be adaptable to changing contextual conditions of the user, the time of day, the type of device, etc. This may result in a combination being shown that is optimized for only a subset of users, while different combinations may be more effective for different subsets of users.

Figure 2:
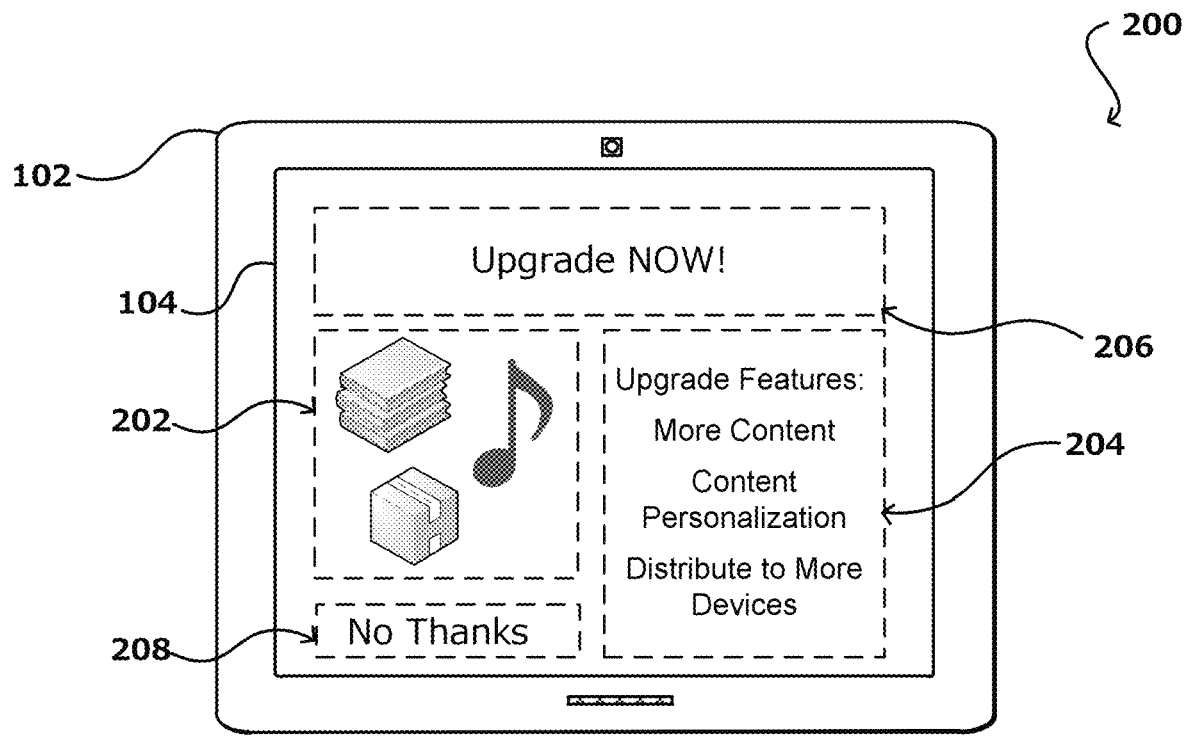
FIG. 2 illustrates an example content layout in accordance with an embodiment.

Systems and methods in accordance with various embodiments can address these and other concerns by generating a content selection model that constrains the dimensionality of the problem and ensures that exploration of the large layout space is balanced with exploitation. For example, the model may be generated based on pairs of content. In some embodiments, a component trainer may be used for each content slot. Each component trainer can identify a content item for its associated slot using context information, which may include the content items displayed by the other content slots as well as user and/or temporal information. Further, such an approach can improve the likelihood of success conditions, as defined by a service provider. In some embodiments, success conditions may be defined based on one or more metrics of user interaction, such as clicks, purchases, and revenue to the provider of that content, the service provider, or other entity. FIG. 2 illustrates an example 200 content layout in accordance with an embodiment. As shown in FIG. 2, a specific combination of content items is displayed. As discussed further below, each content item may be selected from a set of available content items for a given content slot. For example, an image 202 may be selected from among multiple images available for content slot A 106, a text description 204 may be selected for content slot C 108, a header 206 may be selected for content slot B 110, and a link 208 may be selected for content slot D 112. In the example of FIG. 2, a success condition may include selection of header 206, corresponding to the user requesting to upgrade, while failure conditions may include selecting link 208 corresponding to a refusal to upgrade, navigating away from the web page, or other action refusing the upgrade. This combination of content may be selected based on the generated selection model and context information. The context information may include information known about the user and/or the content. This can include, for example, a likelihood of the user "clicking on" or otherwise interacting with the web page or the content to obtain further information about the content items. This can also include a likelihood of the user consuming (i.e., purchasing, renting, downloading, or otherwise obtaining) an item or service represented or described by the combination of content items. Additional context information may include, the type of device that is accessing the web page (or other combination of content), the time of day, past activity by the user or other users (e.g., viewing, sharing, purchasing, etc.), or other information. Such an approach enables content to be optimized for a particular user under particular conditions.

In order to provide such an offering that is personalized for a user, some information needs to be obtained about how likely users, and in particular that user, are to click on, view, purchase, share, or otherwise interact with the combination of content items shown on the page. One way to obtain this information is to monitor the activity of users with respect to various content, and attempt to predict the actions of those users with respect to related content. For example, various possible layouts may be shown to users. The layout can correspond to various items such as products offered for sale, images of scenes, images of events, images that include information, and various other items. It should be understood, however, that the content items in a given layout can relate to various other types of content as well, and items offered for purchase are merely an example for purposes of discussion. Further, although not shown there can be ways to filter the items shown or select categories or types of interests, among other such options.

As discussed, success conditions may be defined for a layout. User interactions may be monitored for the variations of that layout for success conditions. For example, if the user selects header 206, a success condition may be recorded. The context of this interaction, such as the device in use, the other content items being displayed, the time of day, etc. may also be recorded. Recording a successful interaction may lead to a higher weight associated with the combination of content items shown, given the current contextual conditions. The specific success conditions may vary from layout to layout. For example, in various embodiments, the user can select an option to purchase an item described in the layout. The purchase of an item is often referred to as a "conversion" in e-commerce vernacular, where a visitor to a website has been "converted" to a paying customer, or a view has been converted into a transaction, etc. In such an example, success conditions may be defined as a number of conversions, conversion rate, etc. Similarly, detection of a failure or negative event, such as selection of link 208 or navigating away from the page, may be recorded and used to reduce a weight associated with the combination of content items shown.

Figure 3:
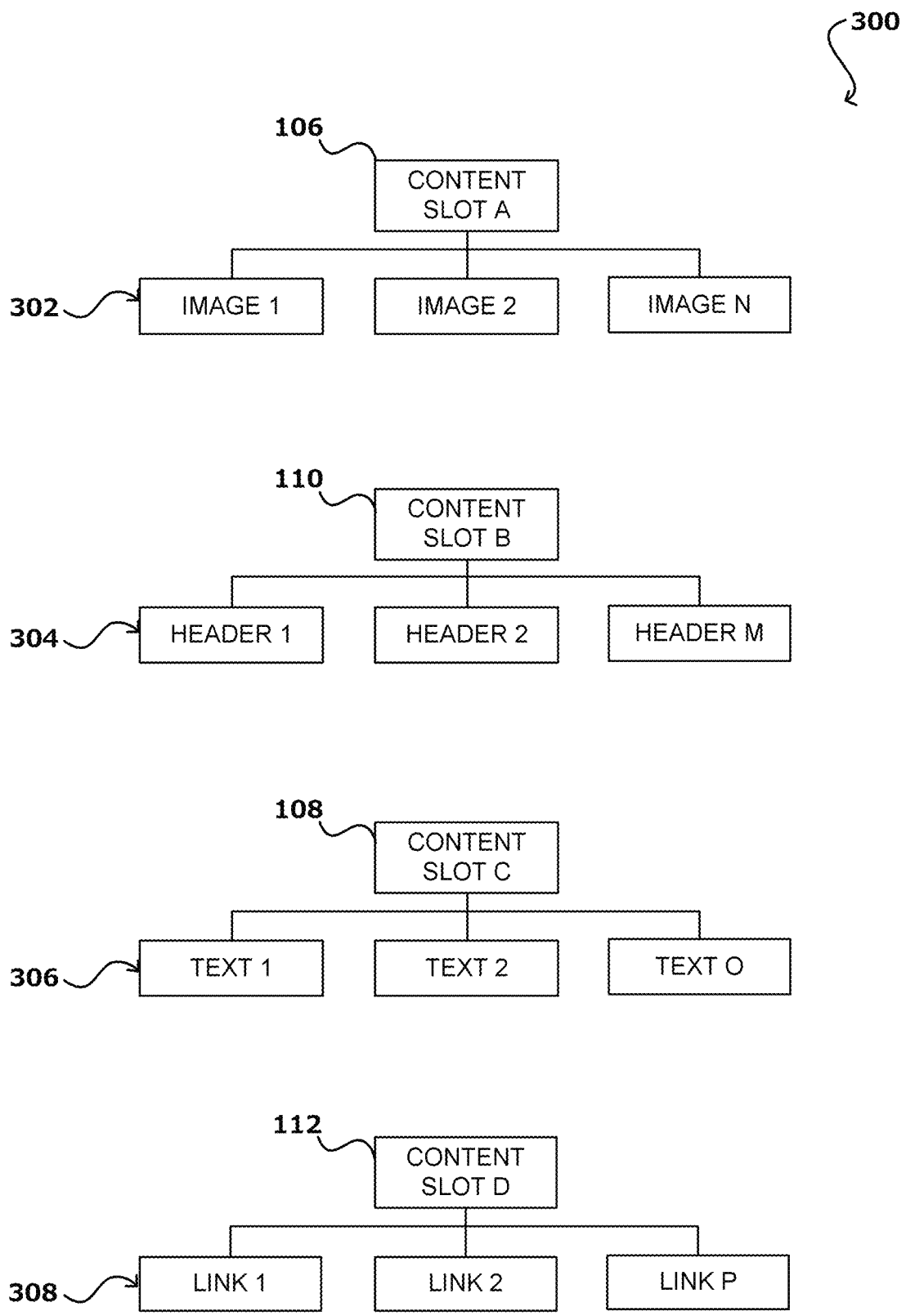
FIG. 3 illustrates an example of content that may be shown in different slots in accordance with various embodiments.

FIG. 3 illustrates an example 300 of content that may be shown in different slots in accordance with various embodiments. As discussed, a given content layout may be associated with multiple components, also referred to as content slots and/or widgets. Each content slot 106-110 may be associated with multiple content items that may be used in that slot. For example, content slot A 106 is associated with image content items 302 (image 1 . . . image N). Content slot B 110 is associated with header content items 304 (header 1 . . . header M). Content slot C 108 is associated with text content items 306 (text 1 . . . text O). Content slot D 112 is associated with link content items 308 (link 1 . . . link P). Although this layout is associated with three components, each associated with a different type of content item, this is for simplicity of explanation only. Various embodiments may be used for layouts having more or fewer components associated with different types of content items. Additionally, layout is used herein to broadly describe any collection of content items. For example, a combination of visual and audio content items, or all non-visual content items, may also be referred to herein as a "layout." As shown in FIG. 3, for each component, we can have several content items. In a situation with D components and N available content items for each component, then there are N^D possible layouts. In the example shown in FIG. 3, where there are N available images, M available headers, O available text items, and P available link items, the number of possible layouts is N*M*O*P. As the number of available content items increases, the total possible layouts can become unfeasibly large. Instead of constructing and testing all such possible layouts, a greedy multivariate analysis may be performed to optimize the content in a layout for a given user. This greatly reduces the amount of network traffic required to determine an optimal layout for a given user. By reducing the amount of network traffic, the number of computing systems required to test and analyze the network traffic can be reduced, or reallocated to other computing tasks. Similarly the number of computing systems dedicated to collecting network traffic may be reduced.

Figure 4:
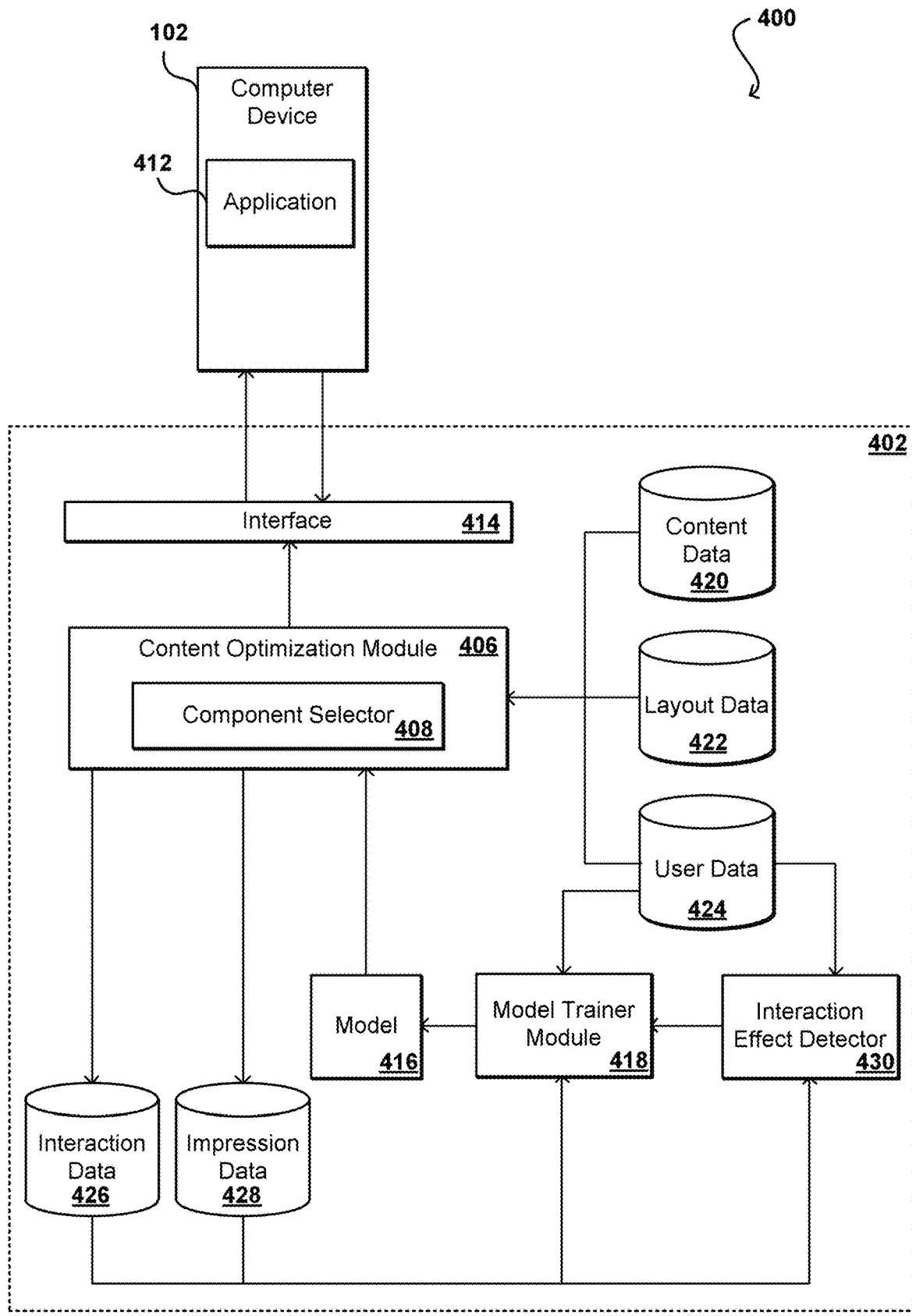
FIG. 4 illustrates an example system for generating a content selection model in accordance with an embodiment.

FIG. 4 illustrates an example system 400 for generating a content selection model in accordance with an embodiment. As shown in FIG. 4, a content optimization system 402 associated with a service provider environment, content provider environment, or other computing environment, can include content optimization module 406, a component selector 408, and a model trainer module 416. In some embodiments, component selector 408 may include multiple component selectors (not shown) which are each configured to select content for particular components within a layout based on context information. Additional or alternative components and elements can be used in such a system in accordance with the various embodiments. Accordingly, it should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein.

In some embodiments, a request for content can be received from an application 412 executing on a computing device 102 through an interface 414, such as a web interface or other network or communication interface. The request can be for any entity that includes a plurality of layouts, such as web pages, audio-visual content (streaming media, slide shows, etc.), or other content. Content optimization module 406 can determine the optimal combination of content to be returned for the request using component selector 408. Component selector 408 can use a content selection model 416 to determine the optimal combination of content. As discussed, content selection model 416 may include one or more models generated and/or updated by model trainer module 418. In some embodiments, a model may be generated for each layout that may be served by content optimization system 402. As discussed, the model may include a plurality of weights for different groupings of content items. For example, weights may be determined for different pairs of content items, triplets of content items, or other higher order combinations. The component selector may be configured to determine the optimal combination of content items based on the content selection model using a search algorithm, such as the hill-climbing algorithm, or other techniques.

The content optimization system 402 may also include various data stores to store data and/or files in connection with model generation and content layout selection. In various embodiments, the component selector 408 can determine the optimal combination of content to return using the content selection model 416 and content data 420, layout data 422, and user attribute data 424. User attribute data store 424 may store data about individual users, including information regarding interests, demographic characteristics, account information, etc. The content optimization system may also include a content data store 420 to store the corpus of content (or information about the content) available for components of different layouts. The content optimization system may also include a layout data store 422 to store layout definitions which may include the components associated with each layout. In some embodiments, each component may be associated with an identifier that may be used to lookup associated content items in content data store 420.

The content optimization system may also include an interaction data store 418 to store data about types of interactions that may occur with a given layout, these interactions may include interactions that satisfy defined success conditions, failure conditions, etc. In some embodiments, interaction data store 426 can store information about the various interactions that users have performed with content, such as requests for content, purchases of items referenced in the content, etc. Impression data store 428 can store an indication of the combination of content items that resulted in a particular interaction. In some embodiments, the past interactions stored in interaction data 426 may be indexed to impression data store 428 such that the combination of content items that resulted in a particular interaction may be identified. The data stores and other components of the content optimization system and described herein are illustrative only, and are not intended to be limiting. In some embodiments, fewer, additional, and/or alternative data stores and/or components may be implemented by a content optimization system. As shown in FIG. 4, user data 424, interaction data 426, and impression data 428 can be used to train and update the content selection model 416. In some embodiments, this data may also be used by interaction effect detector 430. For layouts having multiple components, some content items may affect other content items. This may result in pairwise or higher order (e.g., 3-way, 4-way, etc.) interaction effects between content items. When interaction effects between content items are detected, an interaction term can be added to content selection model 416 which may be used in addition to the weights discussed above when determining the optimal combination of content items.

The content optimization system 402 may be implemented on one or more physical server computing devices that provide computing services and resources to users. In some embodiments, the content optimization system (or individual components thereof, such as the content optimization module 406, model trainer module 418, etc.) may be implemented on one or more host devices, such as blade servers, midrange computing devices, mainframe computers, desktop computers, or any other computing device configured to provide computing services and resources. For example, a single host device may execute one or more content servers, one or more group generators, various data stores, some combination thereof, etc. The content optimization system may include any number of such hosts.

In some embodiments, the features and services provided by the content optimization system 402 may be implemented as web services consumable via a communication network. In further embodiments, the content optimization system (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

Individual computer devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user, including customers, administrators, other computing devices of a service provider, etc. may operate a computer device to access and interact with content managed by the content optimization system 402. In some embodiments, a user may launch specialized application software, such as application 412 executing on a particular user device, such as a smart phone or tablet computer. The application 412 may be specifically designed to interface with the content optimization system for accessing and interacting with content. In some embodiments, a user may use other application software, such as a browser application, to interact with the content optimization system.

In this example, the computing device 102 can request content from the service provider via a communication network. For example, computing device 102 can request content such as text, documents, audio recordings, video, images, animations, and the like. The content request can be received at content optimization module 406. The request can be received at, for example, a network interface layer 414 of content optimization system 402. The network interface layer can include any appropriate components known or used to receive requests from across a network, such as may include one or more application programming interfaces (APIs) or other such interfaces for receiving such requests. The network interface layer 414 might be owned and operated by the service provider, or leveraged by the service provider as part of a shared resource or "cloud" offering. The network interface layer can receive and analyze the requests from the computing device, and cause at least a portion of the information in the requests to be directed to an appropriate system or service of the content optimization system.

As discussed, when a user accesses application 412 on a computing device 102 to retrieve content, the computing device may establish a connection with the content optimization system 402. The computing device may receive content from a content optimization module 406 of the content optimization system via the connection. The content may include network resources such as Web pages, content posts, documents, images, videos, and the like. Illustratively, the content may be received as an individual piece of content (an individual Web page) or as a "feed" of multiple pieces of content. A user of the computing device can interact with the content by activating links to other content, submitting search queries, initiating the purchase of items referenced in the content, etc. Information regarding user interactions with the content can be transmitted to the content optimization system for processing by content optimization module 406. In addition, information regarding the interactions, or some subset thereof, may be stored for use in determining groups of similar items and/or users. As discussed, information regarding interactions may be stored in the interaction data store 426. In some embodiments, user interaction data may be collected over a period of time (e.g., hourly, daily, weekly, etc.) and aggregated before being analyzed. As discussed, when the aggregated data is analyzed, those instances where a specified success condition, failure condition, or other defined condition, is detected can be identified. For example, if the success condition was defined as purchasing Item A, all user layouts that resulted in the user purchasing Item A may be identified. The identified layouts may then be analyzed to determine common pairs of components. For example, more frequently appearing pairs of components may receive a higher weight than less frequently appearing pairs of components. As discussed, specific combinations of content items or indications of those combinations of content items corresponding to the interactions stored in interaction data store 426 may be stored in impression data 428.

A model trainer module 418 may use impression data 428, user data 424, and interaction data 426 such as user behavior data or other such data to a content selection model that can be used to select content for a given layout to maximize a reward in a given context. In some embodiments, training data may be used to generate the model. The training data may be artificially created having known distribution characteristics. In some embodiments, live data, collected from actual users may be used to generate the model. For example, data may be collected initially by showing layout variations at random to different users and collect interaction data. The interaction data may be analyzed to determine which content pairs were most frequently associated with success conditions. Each possible content pair, or other grouping, may then be assigned a weight corresponding to its likelihood of being associated with a success condition. Subsequently, rather than randomly providing more layout variations, the layouts presented to users may preferentially include pairs of content having higher weights. This process may continue until the model converges (e.g., with a control model or other model).

For example, using the web page example discussed above, this may be formally defined as the selection of a layout A for a web page in order to maximize an expected reward R in a context X. The layout includes D components representing the content of the page. A component may include an image, or block of text, an identifier, or other content. Not all components may include the same type of content. As discussed, each component may have one or more alternatives for what content can be placed there. For simplicity of discussion, if each component is associated with N content items, then there are N^D possible layouts for the web page. 'A' can be represented as a D-dimensional vector, where $A_i$ denotes content chosen for the $i^{th}$ component and takes a value between 1 and N. The reward R may be defined as a success condition (e.g., an action that the user should take after viewing the web page). In some embodiments, the success condition may be based on a number of dollars the customer spends, an indicator for whether the customer clicked on a link, etc. The context X may represent information about the session that may be used to determine the layout. For example, the context might include the time of day, whether the customer is using a mobile device, the customer's recent purchases, content features, etc. In determining the optimal layout A* the following equation may be used:

$$A^{*} = \underset{A}{\operatorname{argmax}} E[R|A,X].$$

To estimate the expected value, the model may represent the probability distribution p(R|A, X) from a set of observations O={Oi}={(Ai, Xi, Ri)}. In this example, R, representing whether a success condition is detected, may be binary. However, other values of R, representing different ranges of outcomes or success conditions, may also be used. Bayesian regression, such as Bayesian Linear Probit Regression (BLIP), may be used to learn a set of weights W from the set of observations (e.g., interaction data). In some embodiments, the BLIP model may assume a data distribution of:

$$p(R|A,X) = \Phi\left(\frac{R*W(A,X)}{\beta}\right)$$

where phi is the cumulative distribution function (CDF) for the normal distribution, beta is a scaling term, and W(A,X) represents an inner product between a set of weights and features. By using a BLIP model, the parameters can be modeled as mutually independent with a Gaussain prior. This allows for sampling of W using p(W|O) efficient for Thompson sampling, or other sampling techniques. Any regression function enabling efficient sampling of weights from the set of observations may be used.

In order for the model to capture interactions between components of an entity, the components themselves may capture the interactions. Depending on available resources and timing requirements of a given implementation, all interactions may be included in the model or fewer interactions may be used. For example, by limiting the model to interactions between groupings (e.g., pairs, triplets, or other groupings), convergence may be reached more quickly at the possible expense of missing some higher order relationships between content that might identify other combinations as resulting in a higher R value. This allows for the inner product W(A,X) to be modeled as:

$$W(A,X)=W_0+\sum_{i=1}^{D}\sum_{j=1}^{N}W_{i,j}*I_{A_i=j}+\sum_{k=1}^{D}\sum_{l=1}^{N}\sum_{m=1}^{D}\sum_{n=1}^{N}W_{k,l,m,n}*I_{A_k=l}*I_{A_m=n}*I_{k<m}.$$

where $I_{Ai}=j$ is the indicator that widget i contains content j. Note that W contains $O(N^2D^2)$ terms.

In various embodiments, context information may be used to identify an optimal combination of content. Weights may be assigned to each grouping based on the context information. For example, X may represent a vector of L categorical contextual features that can each take on one of G values. Contextual information can be added as additional terms in W(A,X) such as:

$$W_2(A,X)=W_1(A,X)+\sum_{l=1}^{L}\sum_{g=1}^{G}W_{l,g}I_{X_l=g}.$$

These contextual terms may be used as explanatory variables to reduce variance in predictions. In order to use context to inform the layout, the contextual features may interact with content identifiers or content features. This allows for personalization. For example:

$$W_3(A,X)=W_2(A,X)+\sum_{d=1}^{D}\sum_{n=1}^{N}\sum_{l=1}^{L}\sum_{g=1}^{G}W_{d,n,l,g}*I_{A_d=n}*I_{X_l=g}$$

Although this limits model complexity, there are still a large number of possible layouts. Accordingly, selecting the optimal layout may still be computationally expensive if all possible layouts were to be analyzed.

As discussed, given $N^D$ possible layouts, it may become unfeasible to test all of the possible layouts. Additionally, it may become difficult to select a layout in real-time or "near" real-time, such that the user does not experience delay due to selection of the layout. Content selection model 416 may be used to determine a layout that has the highest probability of a success condition based on interaction data 46. Multivariate testing, using a bandit algorithm, enables the selection of content for an entity to be optimized without requiring a full factorial analysis of all possible content/component combinations. The bandit algorithm, such as Thompson sampling, upper confidence bound, epsilon greedy, etc., may be used to selectively show particular layouts to a user. That is, rather than treating all possible layout combinations equally, the layout is selected proportionally to the probability that it is the optimal layout.

In some embodiments, Thompson sampling may be used as the bandit algorithm to control the amount of exploration versus exploration in decision making. This may result in displaying layouts that have high uncertainty and potentially a higher reward, rather than the layout having the highest expected reward. Using Thompson sampling, a layout is selected proportionally to the probability of that layout being optimal:

$$A \sim p(A=A^{*}|X,O).$$

This probability may not sampled directly, but may instead be calculated after sampling the model parameters. For ease of notation, assuming all possible values of the BLIP parameters W may be summed. Then, $$\begin{array}{l} p(A=A^{*}|X,O) = \sum_{W} p(A=A^{*}|X,O,W)p(W|X,O) \\ = \sum_{W} p(A=A^{*}|X,W)p(W|O) \\ = \sum_{W} I_{\{A=A^{*}(X,W)\}} p(W|O) \end{array}$$

where A*(X,W) is the optimal choice of A given X and W. The 2nd equality follows because the optimal A* has no dependence on observations once W is known, and because W has no dependence on the current context X. The 3rd equality follows because A* is deterministic once W and X are known. As such, sampling W~p(W|O) and calculating A*(X,W), is equivalent to sampling from p(A=A*|X,O).

In some embodiments, each component of a layout 422 may be associated with a component selector (e.g., a running bandit algorithm). Each component selector may select a content item with the highest likelihood of reward (e.g., the highest pairwise weight in the model, or other grouping, such as 3-way or N-way) based on context information, including the other content items selected for other components on the entity, interaction data 426, user data 424, time, device information, and/or other context data. As user-specific context data is utilized, the combination of content selected for one user may be different than the combination of content selected for another user. Similarly, the content selected for the same user may vary if it is presented at different times of day.

As discussed, weights may be determined for groupings of content items (e.g., pairs, triplets, or higher order groupings). Although pairs of content items may be discussed herein, this is used as an example only and not intended to be limiting. For example, when running regressions as discussed above, it may be determined that there are dependencies between components. For example, a white background and blue text may have a higher success rate than other content pairings. As discussed, by using pairings, rather than each possible layout, the optimal combination of content can be identified more quickly, enabling layouts to be optimized in real time or near real time (e.g., during the course of request/response processing times). As discussed, each component selector 408 may be associated with a different component. To determine the optimal combination of content, each component selector receives as input the content associated with the other components (e.g., the content being displayed, played, or otherwise provided by the other components). In some embodiments, when a request for an entity having multiple components (e.g., a web page, advertisement, or other entity) is received, one of the components may be selected. The component's content selector 408 can determine content for that component based on the content present in the other components of the entity as well as other context information. For example, for an entity having three components C1, C2, and C3, a content selector associated with C1 may identify a content item that has the highest weight with the content item in C2, and the content item in C3, using the content selection model 414. The process may then move on to the content selector associated with C2 and C3 in turn and identify a content item having the highest weight with the other two component's content items. Once each content selector identifies the same content item as the previous iteration, the converged content layout has been identified. Although embodiments are generally described with respect to a single model that is used by each component selector, in some embodiments different component selectors may be associated with different models. For example, an image model may be maintained independently of a header model and a text model.

Figure 5:
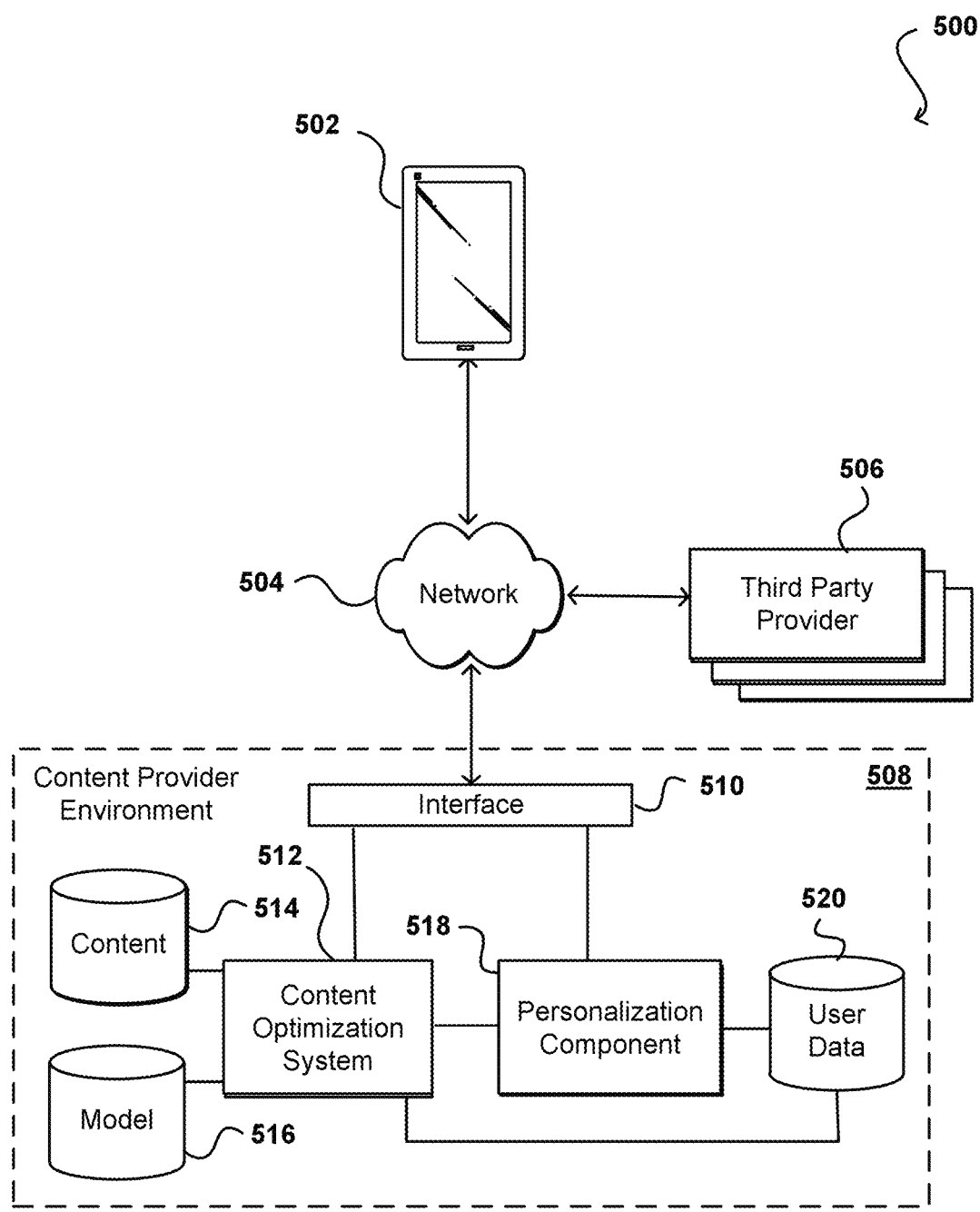
FIG. 5 illustrates an example system that can be used to determine content to provide using the content selection model that can be utilized in accordance with various embodiments.

FIG. 5 illustrates an example system 500 that can be used to determine content to provide using the content selection model that can be utilized in accordance with various embodiments. In FIG. 5, a client computing device 502 can submit a request for content across at least one network 504 to be received by a content provider environment 508. In this example, a call received to the resource provider environment 508 can be received by an interface layer 510 of the environment. As known for network environments, the interface layer can include components such as interfaces (e.g., APIs), load balancers, request and/or data routers, and the like. If the request is a request for content, such as for content for a page to be displayed in an application, information for the request can be directed to a content optimization system 512 (e.g., content optimization system 402), which can obtain the content for a layout from a content data store 514 (e.g., content data store 420) using a content selection model 516 (e.g., model 414) or other such repositories to be sent back across the network(s) to the computing device. In some embodiments, information for the request might also be compared against user data in a user data store 520 (e.g., user data store 416) or other such location. As discussed, in some embodiments, this may enable the selected content to be personalized for the requesting user.

In some cases, a request received to the content provider environment 508 might be from another entity, such as a third party content provider 506. As discussed previously, such providers may provide content to be displayed to users as part of, or along with, the served content. In some embodiments, a third party content provider 506 may provide content and layout information, as well as user interaction information, and may be provided with a content selection model for their content. The interface layer can determine the type of request and cause information to be forwarded to content optimization system 512, personalization component 518, or other such element, which in some embodiments can cause the content to be stored to content data store 514 or other appropriate location. Any information associated with the content, such as a description or identification of one or more features of the items represented in the content, can also be provided and stored in the data store 514.

In some embodiments, when a third party provider 506 provides content to be analyzed by content provider environment 508, the content provider environment 508 may instantiate a data store specific to the requesting third party and store the content in the new data store. As discussed, user interaction data and layout information may also be provided by the third party. In various embodiments, the requesting third party may request one or more optimizations based on one or more success conditions. Using the information from the third party requestor, the content provider environment 508 may then determine select content for the third party layout to maximize the one or more success conditions. The content provider environment 508 can return the content selection model to the third party. In some embodiments, the content provider environment 508 may return an optimized entity. For example, if the optimized layout is for a web page, the entity may include the complete web page, including the selected content items in the appropriate locations. This enables the requesting third party to plug in the optimized entity into their own system, and offload all model maintenance and updating to the content provider environment as a service. Periodically, the third party requestor may provide updated user interaction data, context data, etc. which the content provider environment may use to update the third party's content selection model.

When a set of images, or other content, is to be provided to a user, such as for a layout, the content optimization system 512 in this example can use content selection model 516, or other such system or service, in order to determine which content is to be displayed, and in which components of the requested layout. As discussed, the content selection model may use context data to identify which content should be included in a layout. Context data may include the other content items being displayed as well as user data, location data, time of day or other temporal data, etc. Personalization component 518 can determine context data for use by content optimization system 512 to select content for the layout. For example, personalization component 518 may extract temporal and location data from requests received through interface 510. In some embodiments, personalization component 518 may determine user data 520 associated with the request and provide the user data to content optimization system 512. The context data may then be used with content selection model 516 as discussed above to select content for the layout to be returned in response to the request.

In various embodiments, the content selection model may be updated as additional user interaction data is collected. When user interaction data is received, the weight values of associated content pairs can be updated. Similarly, as additional context data associated with the user interaction data, the content selection model may also be updated.

Figure 6:
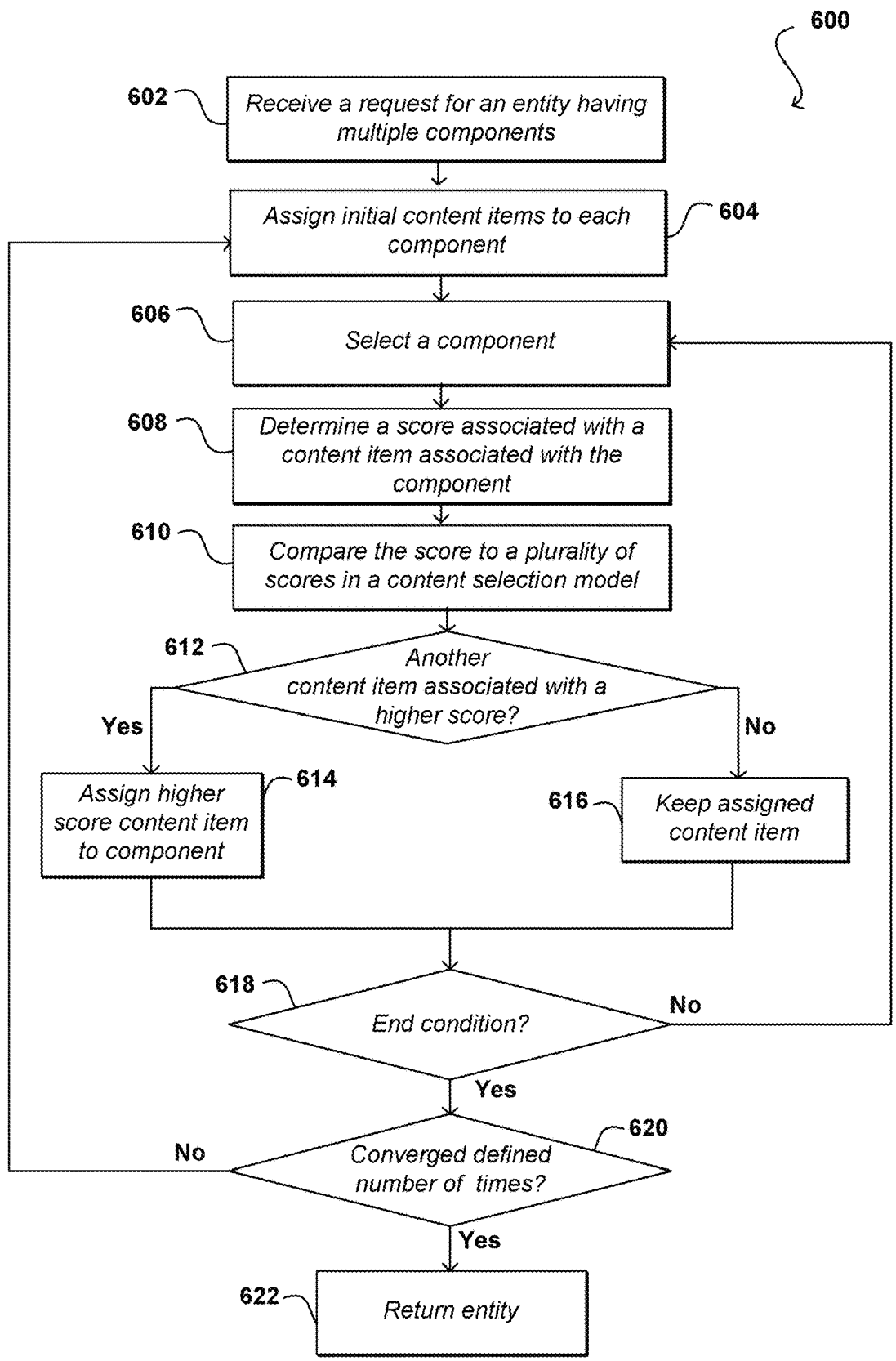
FIG. 6 illustrates an example process for generating a content selection model that can be utilized in accordance with various embodiments.

FIG. 6 illustrates an example process 600 for generating a content selection model that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a request may be received 602 for an entity having multiple components. For example, the entity may be a web page, where each component of the web page is configured to display at least one content item from a respective set of content items. Each component can be assigned 604 an initial content item from the component's respective set of content items. The initial content items may be randomly or pseudo-randomly selected from among the available content items for each component. A first component from the plurality of components may be selected 606. For example, a component may be selected randomly (or pseudo-randomly), or the components may be selected in sequence based on an identifier.

A first score associated with content item may be determined 608. For example, the content item may be an image content item. The score may be determined using a content selection model which defines weights associated with each pair of content items. The score may be determined using context information, which may include at least one of time of day, device information, or user data. The context information may also include the content items currently assigned to the other components in the entity. The weights determined may therefore correspond to each pair of content items in the entity. For example, if the entity includes three content items, then each content item will be associated with two weight values (one for each pair). In some embodiments, where a single bandit model is used to determine the optimal layout, each component may be associated with three weights (one for each pair), but at a point in time two weights may be activated. The score may be determined using the weights associated with the groupings of content items as well as other terms representing the context information, interaction effects between content items, or other terms. For example, a score may be determined by averaging weights associated with a given layout for a content item, or based on other combinations of weights, context terms, or other terms determined for the content items and/or layouts.

The score (or the weight value or values used to determine it) determined for the content item may be compared 610 to a plurality of scores defined in the content selection model. It can be determined 612 whether another content item is associated with one or more higher scores (e.g., if another image content item is a better pairing with a text content item in a given entity). If there is a higher scored content item, then that content item may be assigned 614 to the component. If there is no higher scored content item, then the currently assigned content item may be maintained 616. determine a second image content item having a second weight greater than the first weight, the first weight and the second weight associated with the at least one text content item.

In various embodiments, it may be determined 618 whether an end condition has been reached. An end condition may include at least one of a number of iterations or convergence for each component. For example, if each component has been analyzed 100 times (or any other defined number of iterations), then the analysis may be terminated and the currently assigned content items may be provided in the entity. Additionally, or alternatively, if an iteration has passed without any changes being made to the content items assigned to each component, then the layout has converged and the entity may be returned 620 with the currently assigned content items. If an end condition has not been reached, then processing may return to step 606 and the next component may be analyzed. Although specific end conditions are described herein, these are for simplicity of explanation and not intended to be limiting. A variety of end conditions may be defined and used depending on specific implementations.

As discussed, each component may be associated with a separate content selector implementing an explore-exploit algorithm. Analyzing the next component may include selecting a second component (e.g., the second component may be assigned at least one text content item). The second weight can be compared to the plurality of weights defined in the content selection model based at least on the context information. If the second weight is the highest weight associated with the second image content item based on the context information, then the content item assigned to the second component may be maintained. If an end condition has been reached, then the entity (such as a web page) may be returned in response to the request. The entity will include the currently assigned content items upon which the model and content selectors converged.

In some embodiments, if the end condition has been detected, it may then be determined whether the model has converged on the same combination of content items a defined number of times 620. For example, to reduce the likelihood of a given "optimal" combination being a local optimal rather than a global optimal, the process may be repeated a defined number of times. The number of times the process is repeated may be adjusted based on performance metrics (e.g., how many times can the process be repeated without introducing noticeable delay into normal request/response processing) and/or may be specified by the user, service provider, or other actor. If the process has not been performed the defined number of times, a counter may be incremented and processing may return to step 604 and a new set of initial content items may be assigned to the components and the process may be repeated. If the process has been performed the defined number of times, then the resulting entity may be returned 622.

Figure 7A:
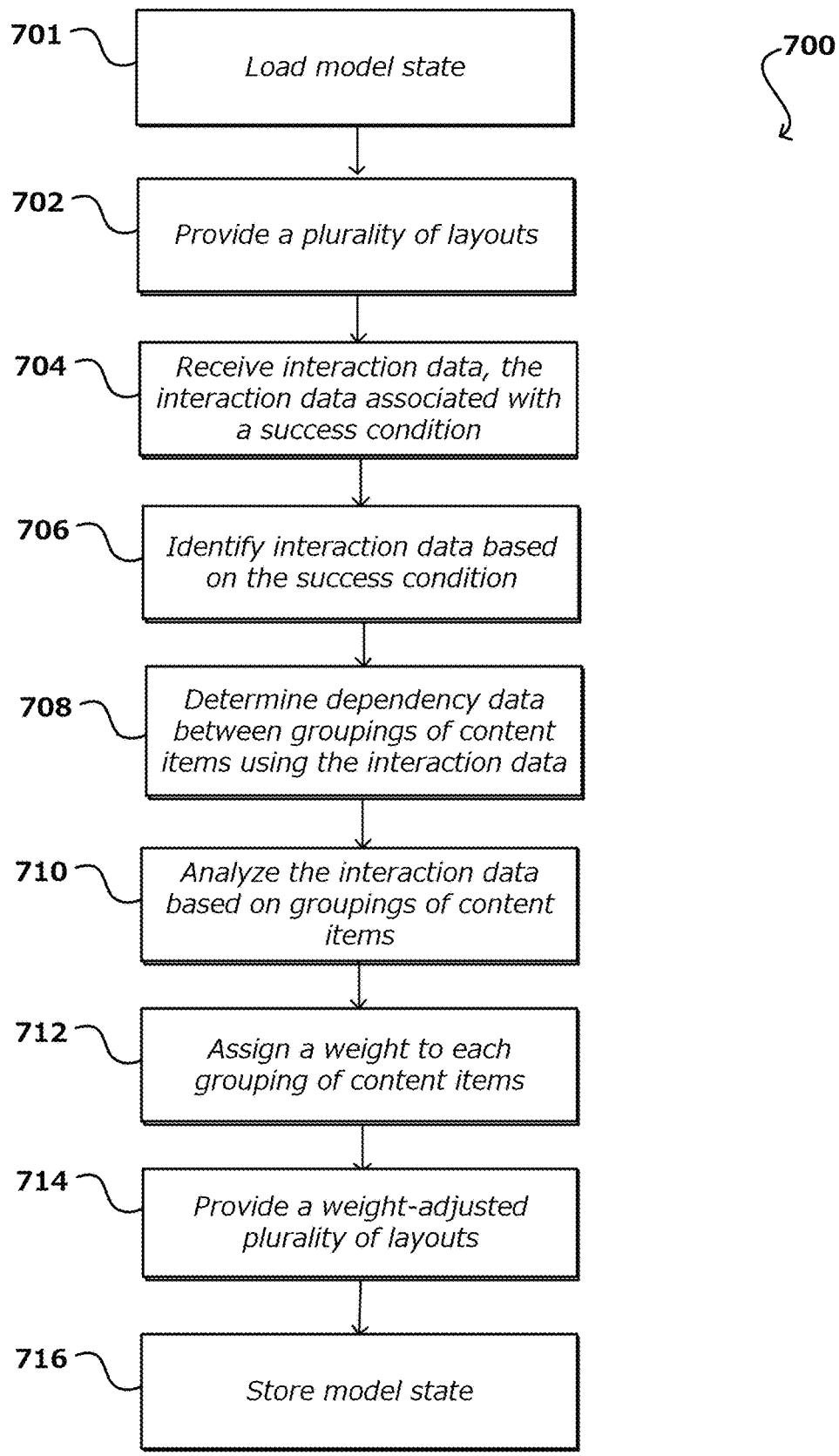
FIG. 7A illustrates an example process for determining content to provide using the content selection model that can be utilized in accordance with various embodiments.

FIG. 7A illustrates an example process 700 for determining content to provide using the content selection model that can be utilized in accordance with various embodiments. In this example, a model state may be loaded 701. In some embodiments, the model state may be a predefined initial state, such as an empty state, random state, or other state. In some embodiments, the model state may be the most recently stored model state that was generated in a previous iteration. After loading the model state, a plurality of layouts of an entity may be provided 702. As discussed, a layout for an entity may include multiple components through which content items may be provided. Each component may be associated with its own set of possible content items. For example, one component may be associated with image content items, while a different component may be associated with text content items. Various layouts, each having different combinations of the possible content items may be provided in response to requests for the entity. This enables different layouts to be interacted with by different users and their interactions with those layouts may be monitored. The interaction data indicating past user interactions with the plurality of layouts may be obtained 704. In some embodiments, the interaction data may be associated with success conditions. In some embodiments, each layout associated with a different combination of content items.

Interaction data including past user interactions that satisfy at least one success condition may be identified 706. For example, the success condition may define at least one action performed by a user after viewing the entity, such as selecting a content item, selecting a hyperlink, or initiating a transaction. Interaction effects between specific content items may be determined 708 based on the interaction data. The interaction effects may be determined for various groupings of content items, including pairs, triplets, or other groupings. The past user interactions can be analyzed 710 to identify groupings of content items in the interaction data. A weight may be assigned 712 to each grouping of content items in the interaction data. The weights may be assigned to the highest level of content interaction, such as pairs, triplets, or higher order groupings. The weight may indicate the likelihood that a given grouping of content items will result in a success condition. Using the weights, weight-adjusted layouts may be provided 714 and further interaction data may be obtained. The weight-adjusted layouts may include the pairs of content items in proportion to their assigned weights (e.g., higher likelihood pairs appear more often in the layouts than lower likelihood pairs). If the model has converged, then the model can be generated based on the weights determined for each pair of content items. The resulting content selection model may then be stored 716. In some embodiments, this stored model state may then be loaded and the process repeated to refine the model data. For example, the process may be repeated periodically (e.g., daily, weekly, monthly, etc.) or may be repeated continuously or near continuously.

In some embodiments, the content selection model may be used to determine an optimal layout for an entity. When a request is received for the entity, for each component in the entity, corresponding content items may be determined based at least on the content selection model and the context information. The entity may then be generated using the corresponding content items and the entity can be returned.

As discussed, each component can be associated with a content selector that implements an explore-exploit algorithm to determine the corresponding content items based at least on the content selection model.

As discussed, in some embodiments, a content selection model and optimized entity may be determined for third parties as a service. For example, interaction data for a plurality of content items may be received for a third party content provider. The interaction data may be received from the third party content provider or through a content broker or other agent acting on behalf of the third party content provider. At least one layout for an entity may also be received for the third party content provider. The entity may define a plurality of components associated with the plurality of content item. The interaction data may be analyzed based at least on a success condition received from the third party content provider to identify pairs of content items in the interaction data. A weight may be assigned to each pair of content items in the interaction data and the content selection model may be generated based at least on the weight assigned to each pair of content items. In some embodiments, the content selection model may be returned to the third party content provider. In some embodiments, requests for optimized entities using the third party content provider's content selection model may be received, and the entity may be generated as discussed above.

As discussed, a layout may include a number of components at fixed locations. Embodiments discussed above may be used to optimize content for each component. For example, images may be associated with a component on top, text items may be associated with a component on the bottom. In some embodiments, components may be conditionally optimized on content and position. For instance, image content items and text content items may be positioned in either component depending on which position is most effective. In some embodiments, context data may include display device information, such as size and orientation, enabling the layout to be automatically optimized based on device.

Figure 7B:
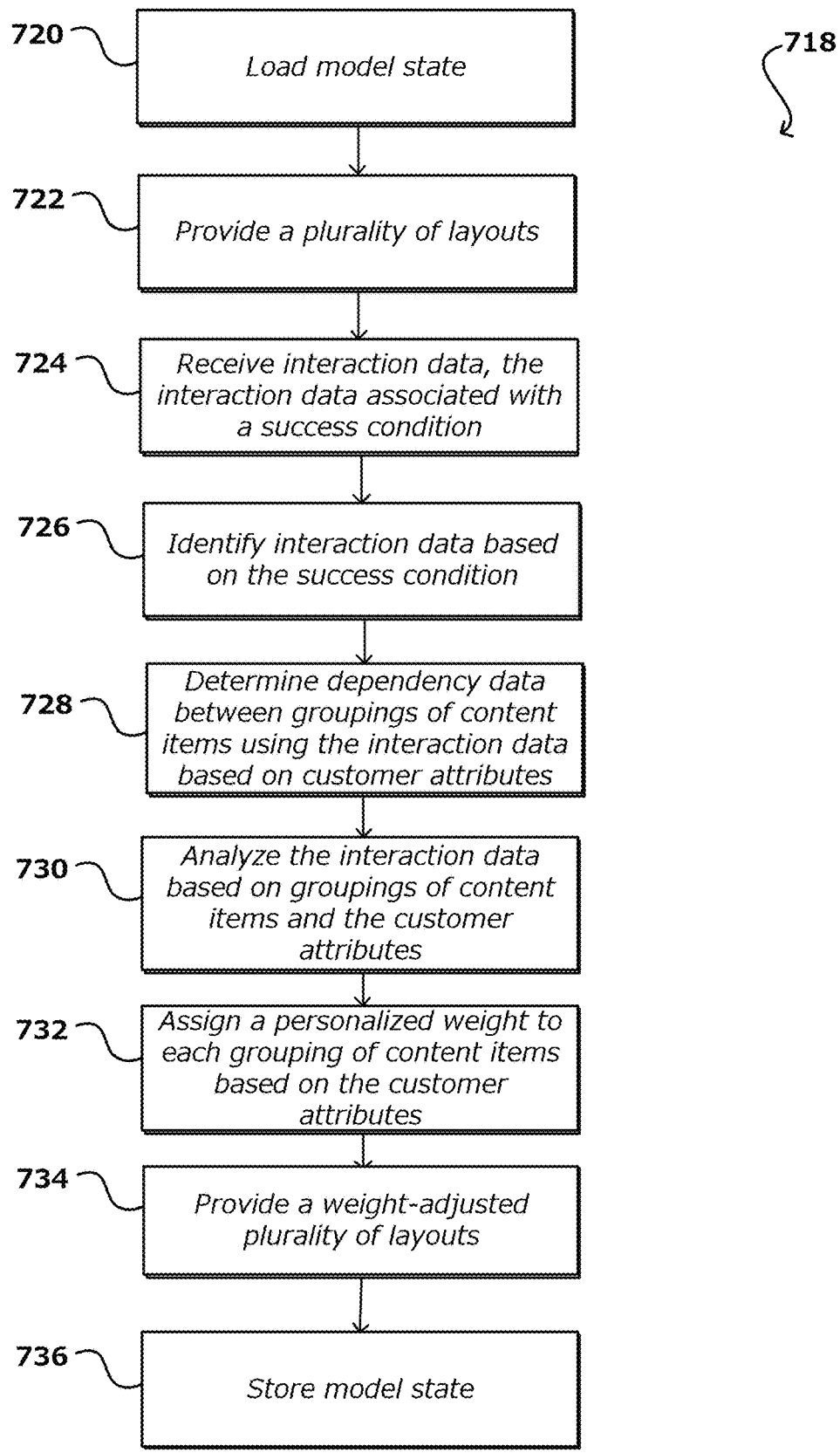
FIG. 7B illustrates an example process for determining content to provide that is personalized based on user attributes using the content selection model that can be utilized in accordance with various embodiments.

FIG. 7B illustrates an example process 718 for determining content to provide that is personalized based on user attributes using the content selection model that can be utilized in accordance with various embodiments. In this example, a model state may be loaded 720. In some embodiments, the model state may be a predefined initial state, such as an empty state, random state, or other state. In some embodiments, the model state may be the most recently stored model state that was generated in a previous iteration. After loading the model state, a plurality of layouts of an entity may be provided 722. As discussed, a layout for an entity may include multiple components through which content items may be provided. Each component may be associated with its own set of possible content items. For example, one component may be associated with image content items, while a different component may be associated with text content items. Various layouts, each having different combinations of the possible content items may be provided in response to requests for the entity. This enables different layouts to be interacted with by different users and their interactions with those layouts may be monitored. The interaction data indicating past user interactions with the plurality of layouts may be obtained 724. In some embodiments, the interaction data may be associated with success conditions. In some embodiments, each layout associated with a different combination of content items.

Interaction data including past user interactions that satisfy at least one success condition may be identified 726. For example, the success condition may define at least one action performed by a user after viewing the entity, such as selecting a content item, selecting a hyperlink, or initiating a transaction. Interaction effects between specific content items may be determined 728 based on the interaction data. The interaction effects may be determined for various groupings of content items, including pairs, triplets, or other groupings. In some embodiments, the interaction effects may be specific to particular users or types of users. Accordingly, user attribute data may be used to determine the interaction effects. For example, content items that are independent for one user, associated with a first demographic data, may show affinity for a second user, associated with second demographic data. The past user interactions can be analyzed 730 to identify groupings of content items in the interaction data. Similarly, user attribute data may be used when analyzing the interaction data to identify groupings of content items. One or more personalized weights may be assigned 732 to each grouping of content items in the interaction data. The personalized weights may be personalized for users or groups of users having particular user attributes. The personalized weights may be assigned to the highest level of content interaction, such as pairs, triplets, or higher order groupings. The personalized weight may indicate the likelihood that a given grouping of content items will result in a success condition for a user having specific user attributes. Using the weights, weight-adjusted layouts may be provided 734 and further interaction data may be obtained. The weight-adjusted layouts may include the pairs of content items in proportion to their assigned weights (e.g., higher likelihood pairs appear more often in the layouts than lower likelihood pairs). If the model has converged, then the model can be generated based on the weights determined for each pair of content items. The resulting content selection model may then be stored 736. In some embodiments, this stored model state may then be loaded and the process repeated to refine the model data. For example, the process may be repeated periodically (e.g., daily, weekly, monthly, etc.) or may be repeated continuously or near continuously.

In various embodiments, an optimization technique, such as a hill climbing algorithm, may be used to determine optimal positioning of content. For example, a layout A may include D components, each associated with assigned content (out of N) and position (out of D). Weights (W) may be sampled based on $p(W|O)$, where, as discussed, O represents a set of observations (e.g., user interaction data). Layout A may be initialized randomly and, for K iterations, or until convergence, a component i can be selected to be optimized. For each possible content $A_i=j$ for component i, the layout A can be scored using $p(R|A,X,W)$. For all other positions m, the layout A can be scored with the content of positions i and m swapped, using $p(R|A,X,W)$. Layout content $A_i$ can be updated with the layout that maximizes $p(R|A,X,W)$. As such, at each iteration, the positions may be swapped or substituted, but not both. If there are N alternatives for the content and D positions/components, a total of N+D−1 layouts may be scored at each iteration. Like the fixed-position components examples discussed above, pair-wise interactions of content on a web page may also be used, resulting in set of weight W including $O(N^2D^2)$ terms.

Figure 8:
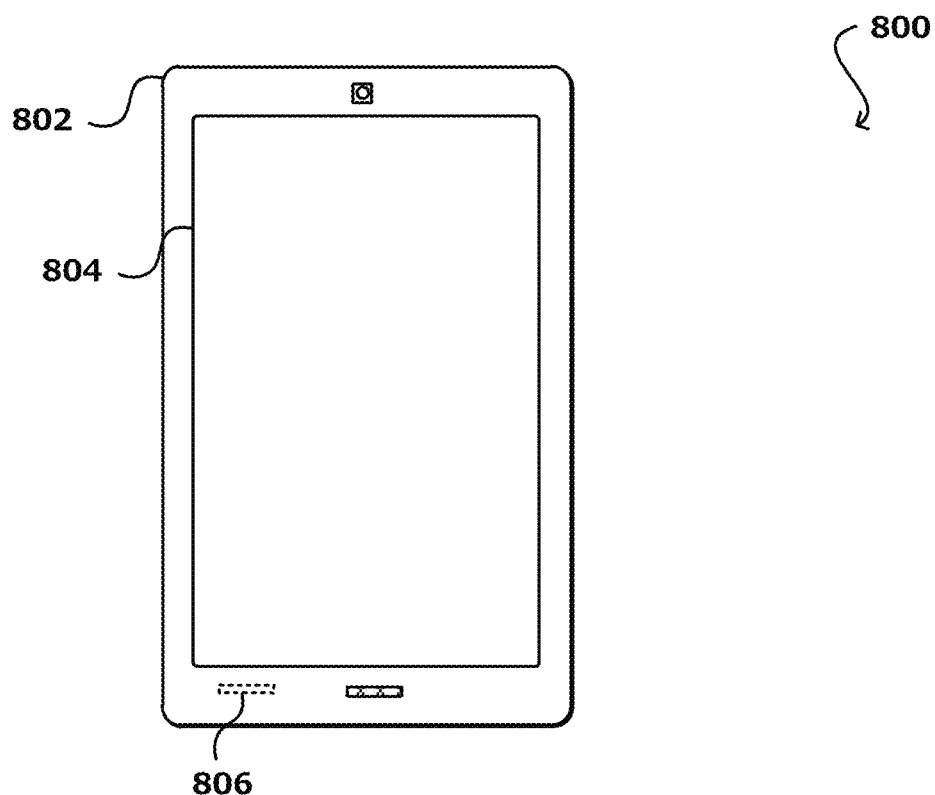
FIG. 8 illustrates an example computing device that can be utilized in accordance with various embodiments.

FIG. 8 illustrates an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 9:
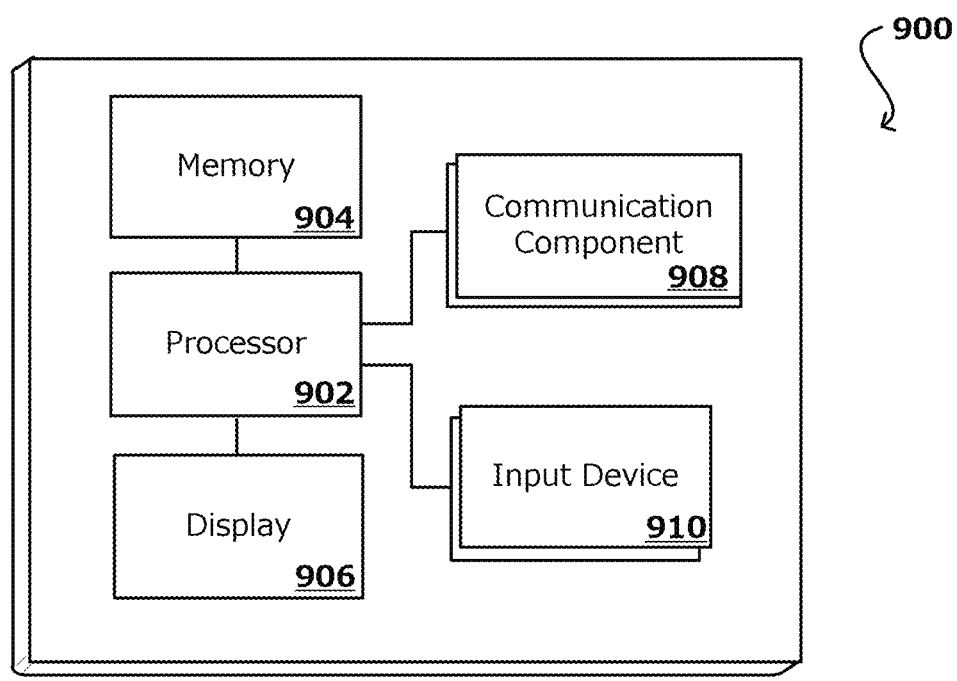
FIG. 9 illustrates an example configuration of components of a computing device, such as the device illustrated in FIG. 8.

In this example, the computing device 800 has a display screen 804 and an outer casing 802. The display screen under normal operation will display information to a user (or viewer) facing the display screen (e.g., on the same side of the computing device as the display screen). As discussed herein, the device can include one or more communication components 806, such as may include a cellular communications subsystem, Wi-Fi communications subsystem, BLUETOOTH® communication subsystem, and the like. FIG. 9 illustrates a set of basic components of a computing device 900 such as the device 800 described with respect to FIG. 8. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device can include at least one communication component 908, as may enabled wired and/or wireless communication of voice and/or data signals, for example, over a network such as the Internet, a cellular network, a Wi-Fi network, BLUETOOTH®, and the like. The device can include at least one additional input device 910 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10:
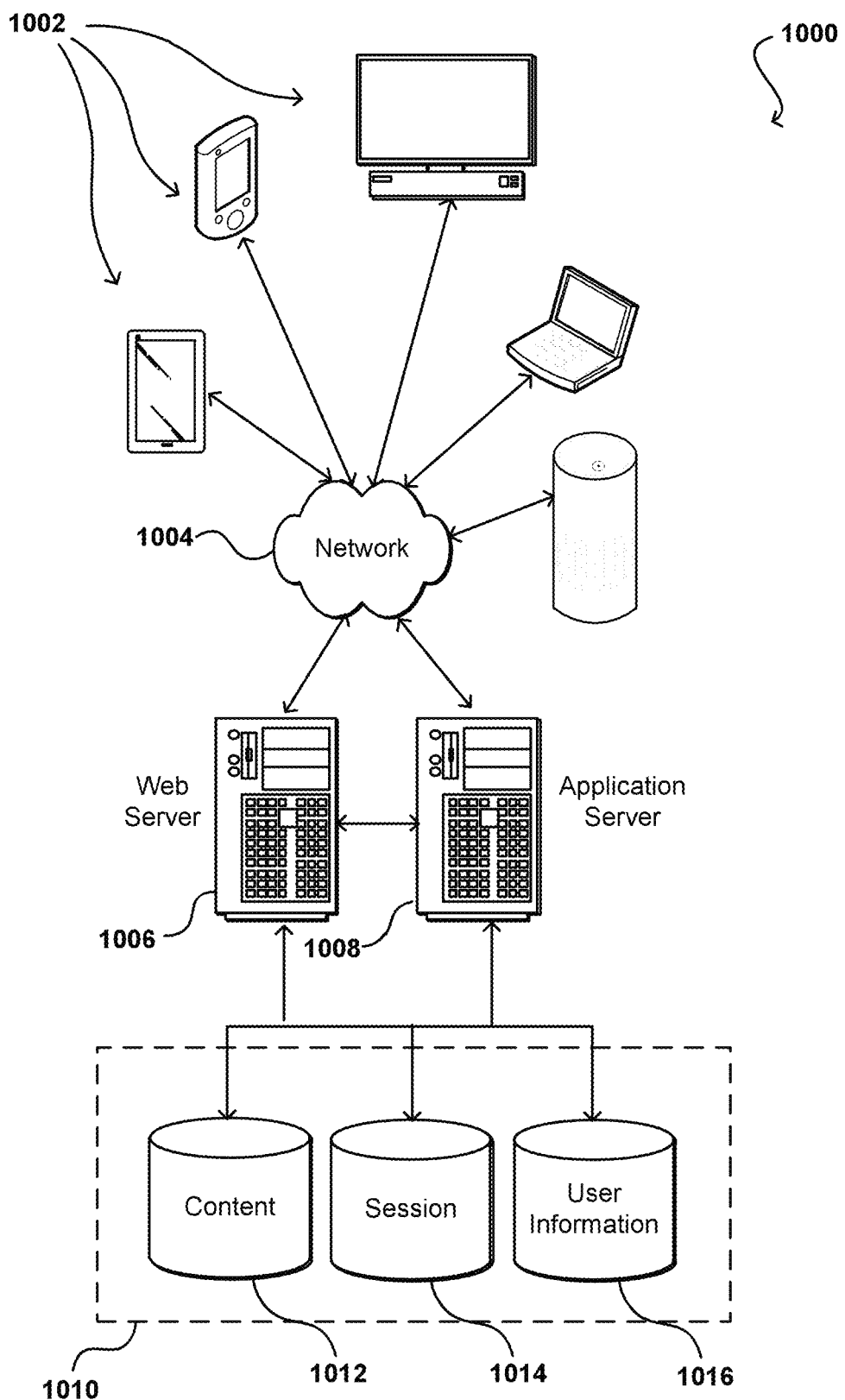
FIG. 10 illustrates an example environment in which aspects of the various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers, a voice-enabled communications device and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device

1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
at least one processor; and
memory storing instructions that, when executed by the at least one processor, cause the system to:
receive interaction data associated with a plurality of layouts of a web page and at least one success condition for the web page;
analyze the interaction data to identify pairs of content items in the plurality of layouts;
assign weights to individual pairs of content items in the plurality of layouts;
generate a content selection model based at least on the weights assigned to the individual pairs of content items;
receive a request to view the web page, the web page having a layout that includes a plurality of components including at least a first component configured to show an image and a second component configured to display text, wherein a component is configured to display at least one content item from a respective set of content items;
assign initial content items to individual components from the plurality of components, the initial content items selected from the individual components' respective set of content items;
select a first component of the plurality of components corresponding to the request, the first component assigned a first image content item;
determine a first score associated with the first image content item by identifying respective weights for two or more of the individual pairs of content items using the content selection model, the two or more individual pairs of content items each having a pair weight associated with the individual content items collectively forming the two or more pairs, wherein the content selection model uses a greedy multivariate analysis of a plurality of selections of the content items;
compare the first score to a plurality of scores defined in the content selection model based at least on context information, the context information including a text content item assigned to a second component of the web page;
determine a second image content item having a second score greater than the first score;
assign the second image content item to the first component;
determine an end condition has not been reached; and
analyze the text content item corresponding to the second component based at least on the second image content item.

2. The system of claim 1, wherein the instructions to analyze the text content item corresponding to the second component based at least on the second image content item, when executed, further cause the system to:
select the second component, the second component assigned the text content item;
compare the second score to the plurality of scores defined in the content selection model based at least on the context information;
determine that the second score is the highest score associated with the second image content item based on the context information;
determine the end condition has been reached; and
return the web page in response to the request, the web page including the second image content item and the text content item.

3. The system of claim 1, wherein the instructions to determine the end condition has been reached, further cause the system to:
determine the web page has converged a defined number of times.

4. The system of claim 1, wherein the context information includes at least one of time of day, device information, or user data.

5. A computer-implemented method, comprising:
obtaining interaction data indicating past user interactions with a plurality of layouts associated with a plurality of combinations of content items;
analyzing the interaction data to identify groupings of the content items associated with at least one success condition;
calculating respective weights for multiple of the groupings of content items in the interaction data, the respective weights corresponding to at least two content items being presented together;
updating a content selection model based at least on the respective weights of the groupings of content items; and
determining, using a greedy multivariate analysis of a plurality of selections of the content items according to the content selection model, a subset of the content items to be provided for display according to one of the plurality of layouts by identifying weights for at least two groupings of the subset of content items.

6. The computer-implemented method of claim 5, further comprising:
providing a weight adjusted plurality of layouts of the entity, the weight adjusted plurality of layouts including the groupings of content items in proportion to their assigned weights; and
obtaining interaction data for the weight adjusted plurality of layouts.

7. The computer-implemented method of claim 6, further comprising:
updating the content selection model using the interaction data for the weight adjusted plurality of layouts; and
storing the content selection model.

8. The computer-implemented method of claim 5, further comprising:
receiving a request for the entity, the request associated with context information;
for individual components in the entity, determining corresponding content items based at least on the content selection model and the context information;
generating the entity using the corresponding content items; and
returning the entity in response to the request.

9. The computer-implemented method of claim 8, wherein a component is associated with a content selector that implements an explore-exploit algorithm to determine the corresponding content items based at least on the content selection model.

10. The computer-implemented method of claim 9, wherein the explore-exploit algorithm uses Thompson sampling.

11. The computer-implemented method of claim 8, determining corresponding content items based at least on the content selection model and the context information further comprises:

assigning an initial content item to the individual components, initial content item selected from the individual components' respective set of content items;
selecting a first component assigned a first content item;
determining a first score associated with the first content item using the content selection model and the context information;
determining a second content item having a second score greater than the first weight; and
assigning the second image content item to the first component.

12. The computer-implemented method of claim 11, wherein the context information includes the content items currently assigned to the individual components and user attribute data.

13. The computer-implemented method of claim 11, further comprising:
selecting a second component, the second component assigned a third content item;
determining that the second score is the highest score associated with the second content item based on the context information;
determining an end condition has been reached; and
returning the entity in response to the request, the entity including the second content item and the third content item.

14. The computer-implemented method of claim 13, wherein the end condition includes at least one of a number of iterations or convergence for the individual components.

15. The computer-implemented method of claim 14, wherein the success condition defines at least one action performed by a user after viewing the entity.

16. The computer-implemented method of claim 15, wherein the at least one action includes one or more of selecting a content item, selecting a hyperlink, or initiating a transaction.

17. A system, comprising:
at least one processor; and
memory storing instructions that, when executed by the at least one processor, cause the system to:
receive interaction data for a plurality of combinations of a plurality of content items for a third party content provider;
receive a content layout for an entity defining a plurality of components associated with the plurality of content items;
analyze the interaction data based at least on one or more success conditions received from the third party content provider to identify groupings of content items in the interaction data that meet the one or more success conditions;
assign a weight to individual groupings of content items in the interaction data, the weight corresponding to at least two content items being presented together and based on the interaction data;
update a content selection model based at least on the weight assigned to the individual groupings of content items; and
determine, using a greedy multivariate analysis of a plurality of selections of the content items according to the content selection model, a subset of the groupings of content items to be provided for display according to the layout by identifying weights for at least two groupings of the subset of content items.

18. The system of claim 17, wherein the instructions, when executed, further enables the system to:
receive a request for the entity, the request associated with context information;
for individual components in the entity, determine corresponding content items based at least on the content selection model and the context information;
generate the entity using the corresponding content items; and
provide the entity in response to the request.

19. The system of claim 18, wherein the context information includes content items currently assigned to the individual components of the entity and at least one of time of day, device information, or user data.

* * * * *